E. T. PRINDLE.
Cutting Tool for Planing Machines.
No. 77,211.  
Patented April 28, 1868.
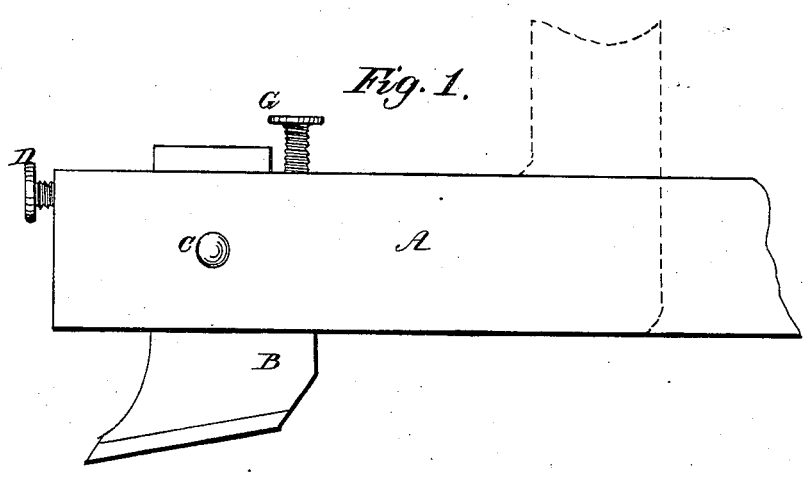
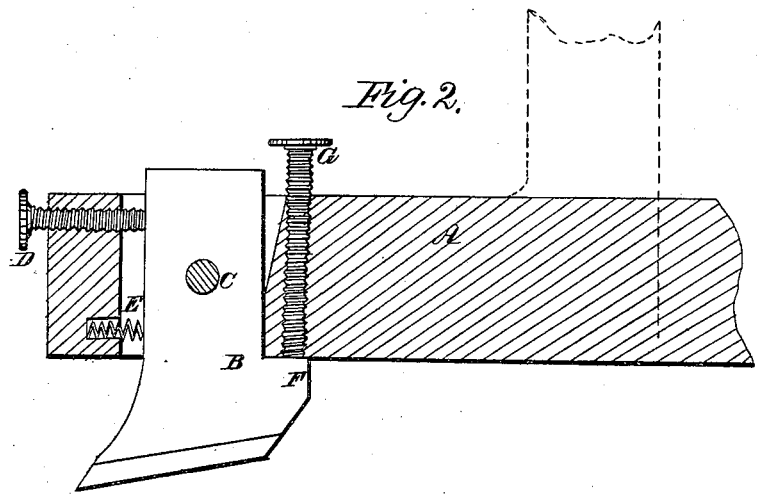

UNITED STATES PATENT OFFICE.

E. T. PRINDLE, OF AURORA, ILLINOIS.

IMPROVEMENT IN CUTTING-TOOLS FOR PLANING AND MILLING MACHINES.

Specification forming part of Letters Patent No. 77,211, dated April 28, 1868.

*To all whom it may concern:*

Be it known that I, E. T. PRINDLE, of Aurora, in the county of Kane, and in the State of Illinois, have invented a new and useful Improvement in Cutting-Tools for Planing and Slotting Machines; and do hereby declare that the following is a full, clear, and exact description thereof, reference being had to the accompanying drawings, making a part of this specification, in which—

Figure 1 is a side elevation. Fig. 2 is a longitudinal section.

The nature of this invention consists, first, in substituting for the tools ordinarily used upon planing and slotting machines one in which the cutting part is easily detached, and others substituted, without removal from the tool-post; second, in so constructing the cutter that while firmly held in place during the forward or cutting stroke it may rise and pass over the work while moving backward, thereby avoiding injury to the cutting point or edge by being dragged; third, in relieving the pin upon which the cutter turns of all strain by the use of a shoulder upon the back of the cutter and a set-screw in the end of the shank; fourth, in providing means whereby the cutters can be so adjusted as to bring them in contact with the work at any angle desired; fifth, in its adaptation to any planing or slotting machine without alteration of the tool-post; sixth, in the use of a spiral spring so arranged that while allowing the cutter to rise by being drawn backward over the work it presses it firmly into place as soon as released.

In the annexed drawings, A represents the shank, made of ordinary square or oblong tool-steel, for holding the cutters, and is fastened in the tool-post in the usual manner. B represents the cutter, passing through a slot near the end of the shank A, and turning upon the pin C. D represents a set-screw, passing through the end of the shank A, and pressing upon the cutter B, operating, in connection with the shoulder F, to prevent strain or injury to the pin C. E represents the spiral spring that holds the cutter in place. G represents a set-screw, bearing upon the cutter at F, for the purpose of adjusting it to any desired angle.

The principal advantages that my invention possesses over others of like construction are, that it can be used upon planing or slotting machines without alteration of tool-post; that it is stronger, less liable to get out of order, and that the cutters can be readily adjusted so as to present the edge or point at the proper angle.

What I claim as my invention, and desire to secure by Letters Patent, is—

The cutting-tool composed of the shank A, cutter B, with the shoulder F, and set-screws D and G, when constructed in the manner and for the purpose substantially as herein specified.

In testimony that I claim the foregoing I have hereunto set my hand this 18th day of February, 1868.

E. T. PRINDLE.

Witnesses:
C. F. GEYER,
GEO. L. RICHARDS.